(12) United States Patent
Panzenhagen

(10) Patent No.: US 10,179,389 B2
(45) Date of Patent: Jan. 15, 2019

(54) AUTOMATED COMPENSATING FLOW CONTROL ASSEMBLY FOR A SOLID MATERIAL SEPARATOR

(71) Applicant: CP Metcast, Inc., New Berlin, WI (US)

(72) Inventor: Carl P. Panzenhagen, New Berlin, WI (US)

(73) Assignee: CP Metcast, Inc., New Berlin, WI (US)

( * ) Notice: Subject to any disclaimer, the term of this patent is extended or adjusted under 35 U.S.C. 154(b) by 0 days.

(21) Appl. No.: 15/487,796

(22) Filed: Apr. 14, 2017

(65) Prior Publication Data

US 2017/0297170 A1    Oct. 19, 2017

Related U.S. Application Data

(60) Provisional application No. 62/323,171, filed on Apr. 15, 2016.

(51) Int. Cl.
| | |
|---|---|
| *B07B 11/06* | (2006.01) |
| *B24C 9/00* | (2006.01) |
| *B07B 11/04* | (2006.01) |
| *B03C 1/10* | (2006.01) |

(52) U.S. Cl.
CPC .............. *B24C 9/006* (2013.01); *B07B 11/04* (2013.01); *B07B 11/06* (2013.01); *B03C 1/10* (2013.01); *B03C 2201/18* (2013.01); *B03C 2201/24* (2013.01); *Y02P 70/179* (2015.11)

(58) Field of Classification Search
CPC ......... B07B 11/04; B07B 11/06; B03B 13/04; B03C 1/10; B03C 1/12; B03C 1/14; B03C 1/24; B03C 1/247; B24C 9/006

USPC .......................................................... 209/231
See application file for complete search history.

(56) References Cited

U.S. PATENT DOCUMENTS

| | | | | |
|---|---|---|---|---|
| 1,866,781 A | * | 7/1932 | Ullrich .................... | B07B 13/16 209/219 |
| 2,696,606 A | * | 12/1954 | Melchior ................ | G01F 23/18 110/189 |
| 2,939,580 A | * | 6/1960 | Carpenter ................ | B03C 1/12 209/2 |
| 3,198,386 A | * | 8/1965 | Hartley ................. | B22C 5/0472 222/55 |
| 3,902,995 A | * | 9/1975 | Jones ..................... | B65G 69/12 209/240 |
| 4,017,384 A | * | 4/1977 | Freeman ................. | B07B 11/04 209/135 |
| 4,130,223 A | * | 12/1978 | Jones ..................... | B03B 11/00 198/524 |
| 4,629,392 A | * | 12/1986 | Campbell .............. | B65G 67/22 141/192 |

(Continued)

*Primary Examiner* — Joseph C Rodriguez
(74) *Attorney, Agent, or Firm* — Wozny Law, LLC; Thomas M. Wozny

(57) ABSTRACT

A compensating flow control assembly for a solid material separator such as a magnetic separator or air wash separator. The compensating flow control assembly automatically controls or adjusts the amount of contaminated shot blast media flowing from a hopper to a rotary magnetic drum, in the case where the solid material separator is a magnetic separator, or to an air chamber in the case where the solid material separator is an air wash separator, based upon the amount of contaminated shot blast media being fed to and held by the hopper.

11 Claims, 6 Drawing Sheets

(56) References Cited

U.S. PATENT DOCUMENTS

| | | | | |
|---|---|---|---|---|
| 4,944,428 A | * | 7/1990 | Gmur | .................. G01G 11/003 177/50 |
| 8,807,344 B2 | * | 8/2014 | Keaton | ................ B03C 1/0332 209/214 |
| 9,539,585 B2 | * | 1/2017 | Reaves | .................... B03C 1/14 |

* cited by examiner

AUTOMATED COMPENSATING FLOW CONTROL ASSEMBLY FOR A SOLID MATERIAL SEPARATOR

BACKGROUND OF THE INVENTION

The present invention relates generally to a method and apparatus for separating solid particulate materials to recover a desired particulate material from a mixture of contaminated media containing the desired particulate material. More specifically, the present invention relates to a compensating flow control assembly used to automatically adjust the amount of contaminated media flowing through a magnetic separator or an air wash separator to be cleaned and reused in other equipment.

Shot blast media such as that used to surface finish or clean castings, forgings, and other such items are propelled by shot blast equipment at the workpieces at very high velocity. As a result, the blast media gradually breaks down into fine dust-like particles called "fines" which are no longer efficient as abrasive media. In addition, the action of surface finishing or cleaning of workpieces such as castings and forgings results in metallic debris such as scale and rust, and non-metallic debris such as molding sand becoming intermixed with and thus contaminating the abrasive shot blast media. Thus, contaminated shot blast media is typically a mixture of re-usable metallic shot, broken down shot (the "fines"), metallic debris, and non-metallic debris. Magnetic separators and air wash separators are well known in this art, and are particularly adapted to separate and recover metallic shot blast media for reuse in shot blast equipment from mixtures thereof with undesirable contaminants.

A typical magnetic separator has a rotary screen drum for receiving contaminated shot blast media, and a rotary magnetic drum positioned below the screen drum for separating the metallic shot blast media from the other contaminants. An air wash separator is similar in that it typically utilizes a rotary screen drum to receive the contaminated shot blast media, but instead of a magnetic drum air wash systems utilize blasts of air forced across the contaminated media to separate the desired shot blast media from other contaminants. A spill gate assembly is positioned between the rotary screen drum and the rotary magnetic drum, or the air wash chamber, to control the flow of the contaminated shot blast media to the rotary magnetic drum or air wash chamber, respectively. Several key factors are critical to the efficient performance of the magnetic separator, namely, (1) the provision of the thinnest possible thickness or curtain of contaminated shot blast media on the surface of the magnetic drum to improve separation efficiency; (2) the provision of a uniform thickness or curtain of contaminated shot blast media on the surface of the magnetic drum which results in a consistent and balanced composition for the recovered shot blast media; (3) the provision of a full width curtain of contaminated shot blast media across the entire axial length of the magnetic drum to improve separation efficiency and provide a more consistent and balance distribution of recovered shot blast media. Such key factors are also critical for air wash systems.

SUMMARY OF THE INVENTION

The present invention provides a solid material separator for separating a desired particulate material from a mixture of contaminated media containing the desired particulate material, comprising: (a) a hopper for holding contaminated media, said hopper having an inlet through which contaminated media enters the hopper, and an outlet through which contaminated media exits the hopper; (b) a separator positioned below the outlet of said hopper for receiving the contaminated media flowing through said outlet from said hopper; (c) a compensating flow control assembly for automatically controlling the amount of contaminated media flowing from said hopper to said separator. The compensating flow control assembly includes (i) a rotary spill gate movable between a closed position covering said hopper outlet to prevent contaminated media from flowing to said separator, and a plurality of open positions where contaminated media flows through said hopper outlet to the separator at various flow rates based upon the amount of contaminated media in said hopper; (ii) a plurality of sensors mounted on said hopper configured to detect the presence of contaminated media within said hopper and positioned so that each sensor when triggered detects a different amount of contaminated media in said hopper, and generates a signal representative of an amount of contaminated media contained in said hopper; (iii) an actuator engaged with said spill gate for moving said spill gate between said closed position and said plurality of open positions; and (iv) a controller coupled to the plurality of sensors for receiving the signals generated by said sensors and operative to control the movement of said actuator to in turn move said spill gate between said open and closed positions.

The contaminated media is preferably contaminated shot blast media.

In one particularly preferred embodiment, the separator is a rotary magnetic drum, and said solid material separator is a magnetic separator. In another particularly preferred embodiment, the separator is an air chamber, and said solid material separator is an air wash separator.

In yet another embodiment, the present invention provides a compensating flow control assembly for a magnetic separator that automatically controls or adjusts the amount of contaminated shot blast media flowing to a rotary magnetic drum based upon the amount of contaminated shot blast media being fed to the magnetic separator. Based upon the amount of contaminated shot blast media entering the magnetic separator, the automated flow control assembly of the present invention controls the amount of contaminated shot blast media flowing to the rotary magnetic drum to not only provide the thinnest possible thickness for the curtain of contaminated shot blast media, but also to provide a uniform thickness for that curtain of material on the magnetic drum, and a full width curtain all the way across the face of the magnetic drum. Magnetic separators equipped with the present flow control assembly can thus provide efficient separation, and compensate for unexpected surges of contaminated material entering the system, In accordance with one embodiment, the present invention provides a magnetic separator having (a) a hopper for holding contaminated shot blast media, and the hopper having an inlet through which contaminated shot blast media enters the hopper, and an outlet through which contaminated shot blast media exits the hopper; (b) a rotary magnetic drum positioned below the outlet of the hopper for receiving the contaminated shot blast media flowing through the outlet of the hopper; and (c) a compensating flow control assembly for automatically adjusting the amount of contaminated shot blast media flowing from the hopper to the magnetic drum. The compensating flow control assembly includes (i) a rotary spill gate movable between a closed position covering the outlet of the hopper to prevent contaminated shot blast media from flowing to the magnetic drum, and a plurality of open positions wherein contaminated shot blast media flows from the outlet of the hopper to the rotary magnetic drum at a calculated flow rate based upon the amount of contaminated shot blast media in said hopper, (ii) a plurality of sensors mounted on the hopper configured to detect the presence of contaminated shot blast media within the hopper and positioned so that each sensor, when triggered, detects a different amount of contaminated shot blast media in the hopper and generates a signal representative of an amount of contaminated shot blast media contained in the hopper; (iii) an actuator engaged with the spill gate for moving the spill gate between its closed position and its plurality of open positions; and (iv) a controller coupled to the plurality of sensors for receiving the signals generated by the sensors and operative to control the movement of the actuator to move the spill gate between its open and closed positions.

The compensating flow control assembly of the present invention is designed in a way that the sensors sense increasing material flow down the length of the separator. As each sensor is triggered from low to high, indicating sequentially increasing amounts of contaminated shot blast media in the hopper, the actuator automatically moves the spill gate to sequentially increase the opening formed at the outlet of the hopper to thereby increase the width of the media curtain on the magnetic drum to compensate for the increasing amount of contaminated shot blast media entering the hopper. If the contaminated shot blast media recedes in the hopper from high to low, indicating a sequentially decreasing amount of contaminated shot blast media in the hopper, so that the contaminated media no longer triggers a higher sensor, the actuator automatically reduces the opening formed at the outlet of the hopper to thereby also reduce the curtain width back down to match or compensate for the decreasing amount of contaminated media contained in the hopper. This automated process allows the system to always maintain the minimum curtain width on the surface of the magnetic drum while also providing separation flow capacity during system surges.

Each sensor when triggered will generate a signal through the controller to the actuator indicating how far the actuator should open or close the spill gate. In the embodiment illustrated and described herein, there are three sensors but more sensors could be utilized depending upon the capacity of the magnetic separator, and the amount of control desired. The three sensors are offset by height and distance from each other so they are able to indicate differing amounts of contaminated media in the hopper. The lowest sensor when triggered indicates an initial amount of contaminated media in the hopper, and is located at the threshold point where it is desired to open the spill gate to its initial position to begin allowing contaminated media to flow to the magnetic drum. Until the lowest sensor is triggered, the spill gate will typically be closed so that contaminated media may build-up inside the hopper to the threshold amount. The second or middle sensor when triggered will signal the actuator to move the spill gate to a more open position to compensate for the additional contaminated media in the hopper. The third or highest sensor when triggered indicates that the greatest amount of contaminated media desired has accumulated in the hopper, and will signal the actuator to move the spill gate to its furthest open position to compensate therefore. The amount the spill gate is opened and closed when each sensor is triggered or not triggered can be set to different percentages based on case by case needs to allow the system to run efficiently. In other words, if the amount of contaminated media in the hopper is at a level where the highest sensor is triggered, then the spill gate should be open 100%.

Once the level of contaminated media in the hopper lowers so that a sensor is no longer sensing the presence of contaminated media at that level, the lack of a triggering signal from that sensor indicates to the actuator that it should close the opening at the outlet of the hopper to the next lower level. So for example if the highest sensor is no longer sensing the presence of contaminated media, the actuator will move the spill gate to a more closed position, i.e. one indicative of the middle sensor. Once the level of contaminated media drops below the middle or second sensor, the actuator will move the spill gate to an even more closed position, i.e. one indicative of the lowest sensor. Once the lowest sensor stops sensing anything then the actuator will fully close the opening at the outlet of the hopper. This cycle enables contaminated shot blast media to pass through the system at a calculated rate for processing by the magnetic drum based on the amount of contaminated media is in the system. The more contaminated media that is in the system, the more the spill gate will open, and vice versa, in order to successfully process contaminated media through the magnetic separator.

In another embodiment, there is provided a method of controlling the flow of contaminated shot blast media within a magnetic separator. The method includes the steps of (a) feeding contaminated shot blast media to a hopper having an outlet through which the contaminated shot blast media may pass to a rotary magnetic drum; (b) sensing the presence of and the amount of contaminated shot blast media in the hopper; and (c) controlling the movement of a spill gate between a closed position prevented contaminated shot blast media from flowing from the hopper to the magnetic drum and a plurality of open positions wherein contaminated shot blast media flows through the outlet of the hopper to the rotary magnetic drum at a flow rate based upon the amount of contaminated shot blast media in the hopper.

DETAILED DESCRIPTION OF THE PREFERRED EMBODIMENTS OF THE INVENTION

Figure 1:
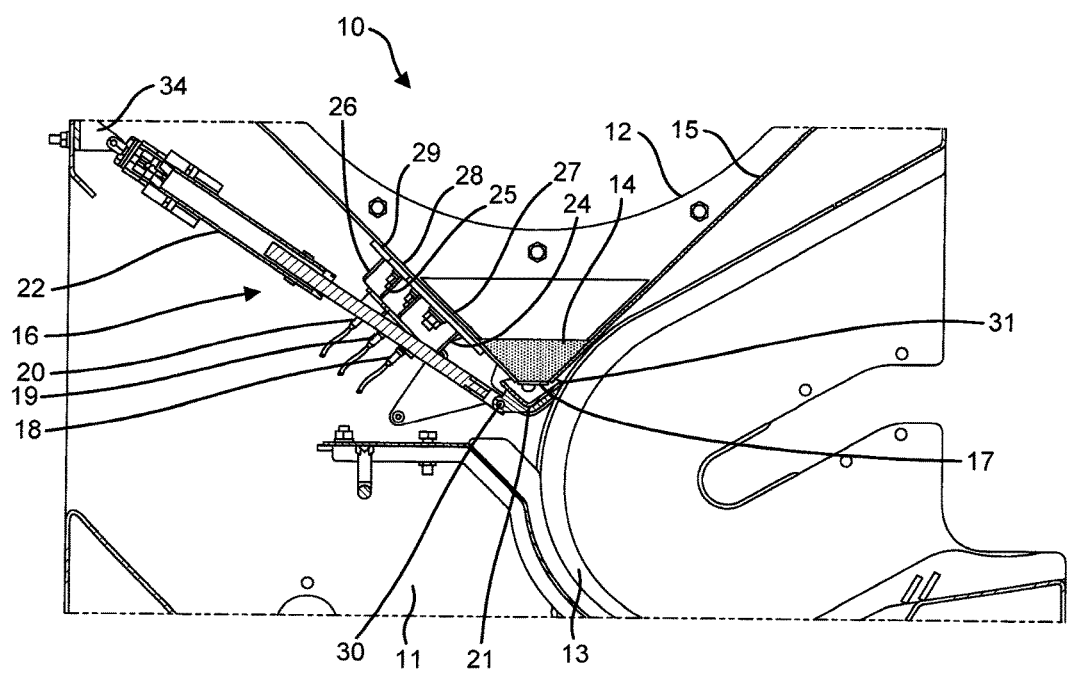
FIG. 1 is side elevational view of a magnetic separator illustrating a compensating flow control assembly in accordance with the present invention with no proximity sensor triggered.

Referring now to FIG. 1, it should be noted that, for clarity reasons, only a portion of a magnetic separator is illustrated as the structure and components of magnetic separators are well known to those skilled in this art. As shown, magnetic separator 10 includes a frame 11, typically constructed of steel, for supporting the various components of the magnetic separator 10. A rotary screen drum 12 mounted for rotation to frame 11 is schematically illustrated in FIG. 1, and a rotary magnetic drum 13 is positioned below drum 12.

As is well known, contaminated shot blast media 14 is fed via an elevator of a shot blast machine (not shown) to screen drum 12 where oversized particles are removed, and the remaining media having potentially re-usable metallic shot blast falls into the inlet of and then to the bottom of a hopper 15 where it will be metered through outlet 17 of hopper 15 to the top of magnetic drum 13 via the compensating flow control assembly of the present invention. The ferrous particles of the contaminated media 14 are held against the surface of magnetic drum 13 to be released at a desired location from drum 13, while the non-ferrous particles of the contaminated media 14 are allowed to flow directly into a waste container (not shown) for subsequent disposal. The ferrous particles are collected and sent to an air-wash system (not shown) for removal of fines and subsequent re-use as clean shot blast media.

As used herein, the term "shot blast media" is well known in this art, and refers to abrasive ferrous particles used in shot blast equipment to surface finish or clean workpieces such as castings and forgings. The term "contaminated shot blast media" is also well known in this art and refers to a mixture obtained from shot blast equipment after a workpiece has been surface finished or cleaned which typically includes re-useable abrasive ferrous particles or shot, non-re-useable ferrous particles such as broken down shot ("fines"), scale and rust, and non-re-usable non-ferrous debris such as molding sand, grit and dust.

FIGS. 1-4 illustrate the compensating flow control assembly, generally indicated at 16, of the present invention in more detail. The compensating flow control assembly 16 is composed of (1) a plurality of sensors for detecting the presence of contaminated shot blast media 14 in hopper 15, i.e. in the embodiment of FIGS. 1-4 there are illustrated three sensors 18, 19 and 20, but more sensors could be used, such as 5 to 10 or more, depending on the capacity of hopper 15 and separator 10 and the amount of precision flow control desired; (2) a rotatable or rotary spill gate 21 for metering the amount of contaminated shot blast media 14 to the magnetic drum 13; (3) an actuator 22 engaged with the spill gate 21 to move the spill gate 21 between open and closed positions; and (4) a controller 23 coupled to the sensors 18-20 and operative to control the movement of the actuator 22 to in turn move the spill gate 21 between its open and closed positions.

Sensors 18-20 are mounted on hopper 15 via mounting brackets 24-26, respectively. Each sensor 18-20 includes a window 27-29 respectively configured to enable sensors 18-20 to "see", i.e. sense or detect, the presence of contaminated shot blast media 14 in hopper 15. Sensors 18-20 are positioned so that each sensor, when triggered, detects a different amount of contaminated shot blast media 14 within hopper 15. This is accomplished by mounting sensors 18-20 in an offset manner so that sensors 18-20 are located at different heights from outlet 17 of hopper 15, and different distances with respect to each other from a center line 32 (see FIG. 5) of separator 10. In other words, the location of each sensor 18-20 varies with respect to each other based upon its respective length from outlet 17 of hopper 15, and from the center line 32 of separator 10. Sensor 18 is the closest to outlet 17 resulting in the shortest height and it is also the closest to the center line 32 of separator 10 which results in the shortest distance therefrom. Thus, when triggered, sensor 18 indicates a lesser amount of contaminated media within hopper 15, and the least amount desired to initiate the opening of spill gate 21. Sensor 19 is further from outlet 17 and the center line 32 of separator 10 than sensor 18, and when triggered, indicates a greater amount of contaminated media 14 within hopper 15 than sensor 18 resulting in the spill gate 21 opening further. In contrast, sensor 20 is the furthest from outlet 17 and it is also the furthest from the center line 32 of separator 10 which results in the greatest distance therefrom. Thus, when triggered, sensor 20 indicates a greater amount of contaminated media within hopper 15 than sensors 18 and 19, and the amount of media 14 in hopper 15 desired to open spill gate to its 100% open position. As a result, as hopper 15 fills with contaminated shot blast media 14, sensor 18 is the first to trigger, sensor 19 is the next to trigger, and sensor 20 is the last to trigger with each sensor 18-20 being triggered based on a different amount or volume of contaminated media 14 in hopper 15.

Figure 2:
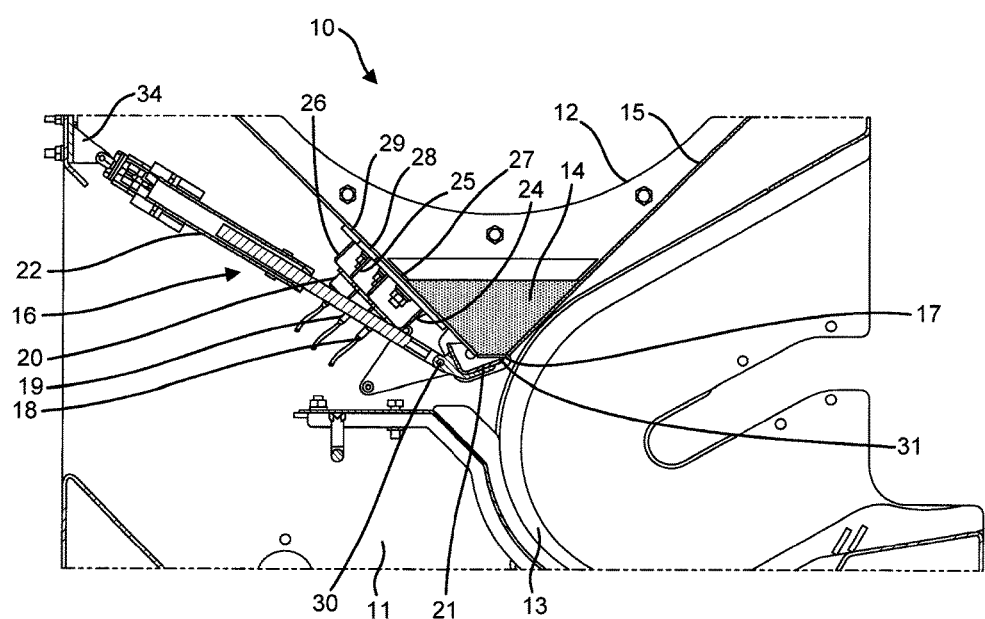
FIG. 2 is side elevational view of a magnetic separator similar to FIG. 1 illustrating a compensating flow control assembly in accordance with the present invention with its lowest proximity sensor triggered.
Figure 3:
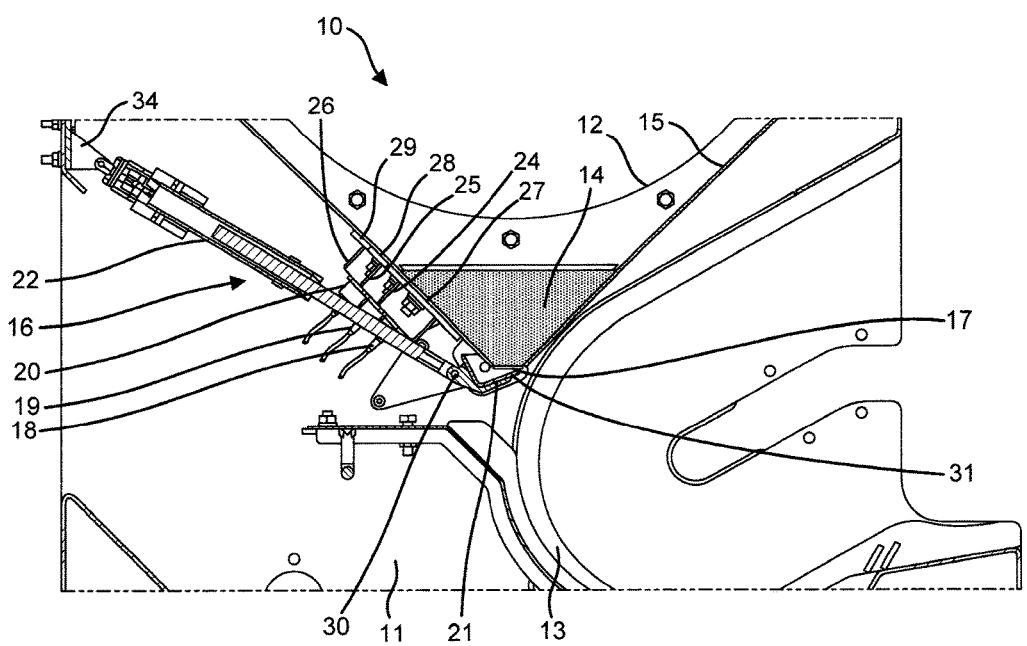
FIG. 3 is side elevational view of a magnetic separator similar to FIGS. 1-2 illustrating a compensating flow control assembly in accordance with the present invention with its middle proximity sensor triggered.
Figure 4:
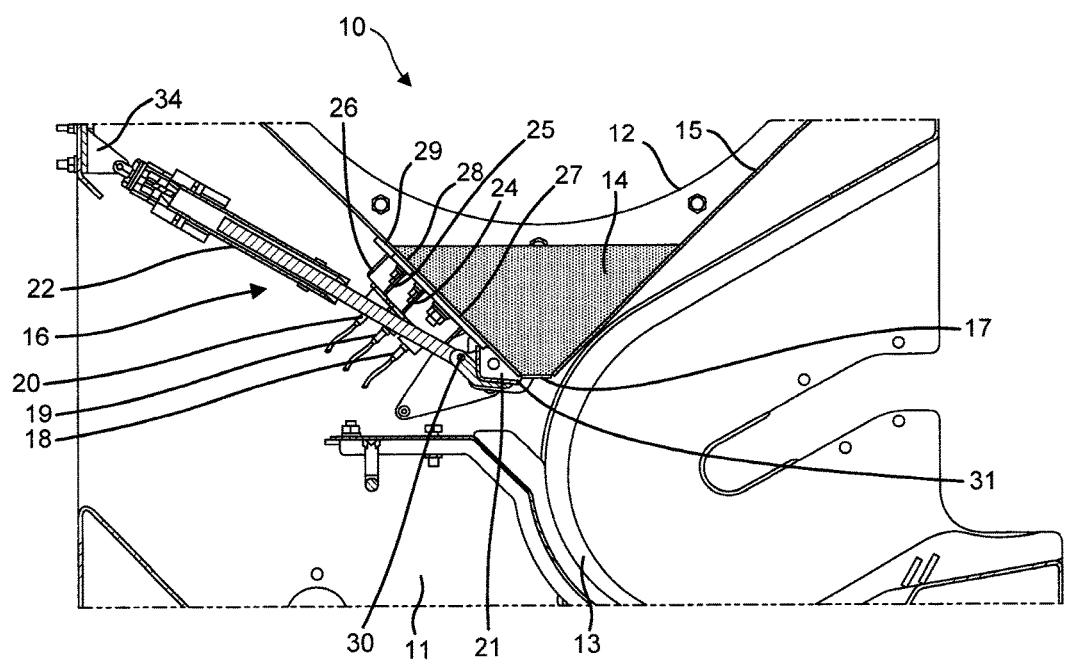
FIG. 4 is side elevational view of a magnetic separator similar to FIGS. 1-3 illustrating a compensating flow control assembly in accordance with the present invention with its highest proximity sensor triggered.

As an example, FIG. 2 shows that sensor 18 will be triggered when the hopper 15 is about one third full of media 14. As a result, spill gate 21 opens to a first position to allow media 14 to flow to magnetic drum 13 at a first rate. FIG. 3 illustrates that sensor 19 will be triggered when the hopper 15 is about one half full of media 14. As a result, spill gate 21 opens to a second position to allow media 14 to flow to magnetic drum 13 at a second rate which second rate is greater than the first rate. FIG. 4 illustrates that sensor 20 will be triggered when the hopper 15 is about two thirds full of media 14. As a result, spill gate 21 opens to a third position to allow media 14 to flow to magnetic drum 13 at a third rate which third rate is greater than the second rate. In contrast, FIG. 1 shows that none of sensors 18-20 are triggered when the level of media 14 in hopper 15 falls below about one third of the volume of hopper 15 resulting in spill gate being in its closed position preventing media 14 from flowing to magnetic drum 13. The point at which each sensor 18-20 is triggered may be adjusted, as well as the degree to which spill gate 21 opens, on a case by case basis to tailor the compensating flow control assembly to any desired separation operation.

The reverse of the above-described sequence of operation also occurs as the amount of media 14 decreases in hopper 15. In other words, when sensor 20 is triggered, the spill gate 21 opens 100% to meter the most media 14 to magnetic drum 13. Thus, as the amount of media 14 decreases within hopper 15 to eventually uncover sensor 20 so that sensor 20 no longer detects any media 14 at that level, but sensor 19 is still covered and thus detecting media 14, the spill gate 21 will move to its second open position to slow the flow of media 14 to magnetic drum 13. Eventually, when the amount of media 14 decreases within hopper 15 to uncover sensor 19 so that sensor 19 no longer detects any media at that level, but sensor 18 is still covered and thus detecting media 14, spill gate 21 will move to its first or least open position to meter even less of media 14 to magnetic drum 13. Finally, when the amount of media 14 decreases within hopper 15 to uncover sensor 18 so that sensor 18 no longer detects any media 14 at that level, spill gate 21 will move to its closed position preventing any flow of media 14 to magnetic drum 13. As noted above, the number and locations of the sensors on hopper 15 may vary to effectively tailor each magnetic separator 10 to any desired pattern of operation as well as the capacity of the magnetic separator 10. In other words, more than three sensors may be employed, e.g. five to ten sensors or more, in order to provide more precise metering of media 14 to magnetic drum 13. Also, the locations of those sensors may be adjusted to permit different triggering points for the amount of media within hopper 15.

In a preferred embodiment, sensors 18-20 are capacitive proximity switches. However, other sensors may be used so long as they are capable of detecting the presence of media 14 within hopper 15 and generating a signal indicative thereof.

Figure 5:
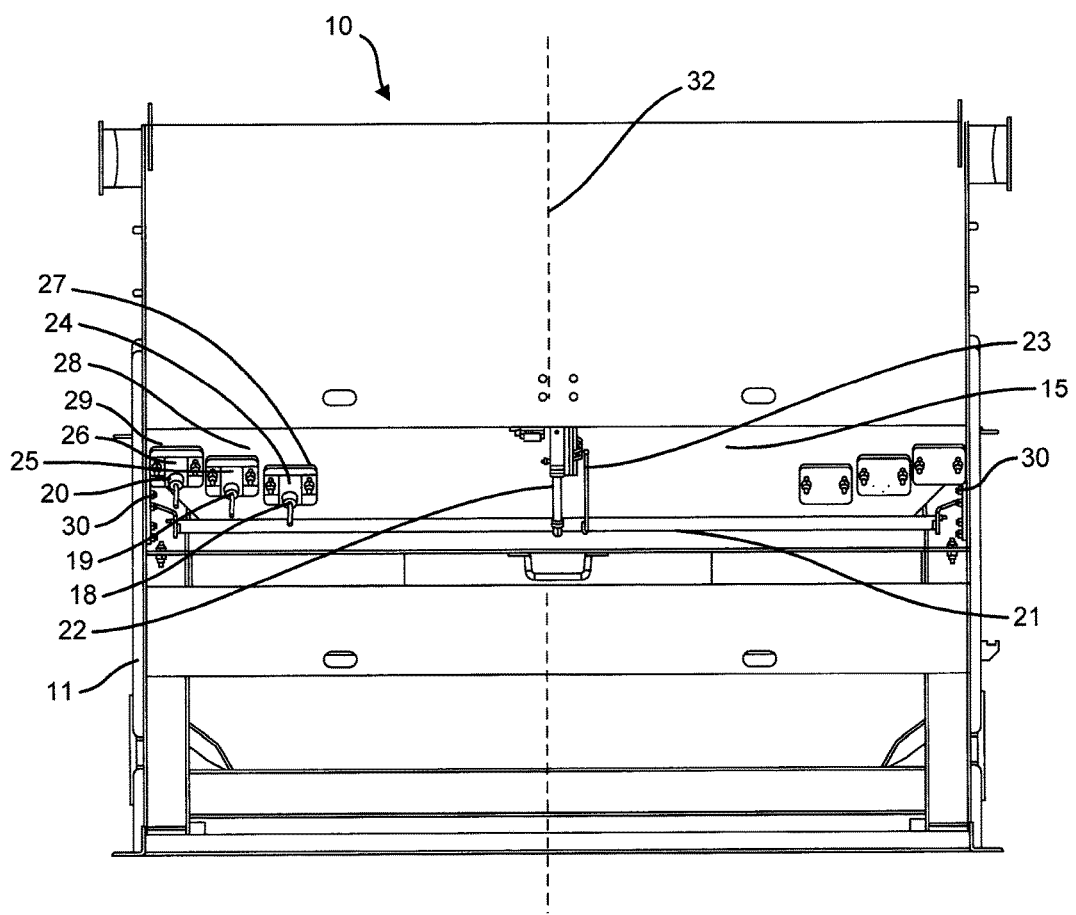
FIG. 5 is rear elevational view of the magnetic separator illustrating the components of the compensating flow control assembly.
Figure 6:
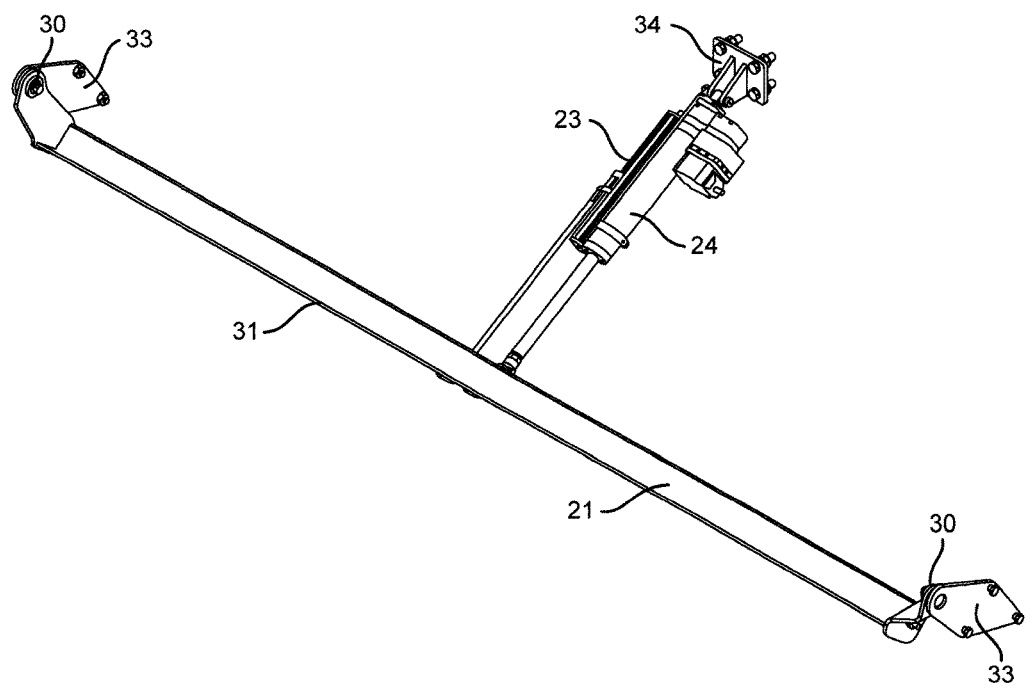
FIG. 6 is a perspective view of the rotary spill gate assembly for the compensating flow control assembly of the present invention.

Spill gate 21 is shown best in FIG. 6, but is also shown in elevation in FIG. 5 and in cross section in FIGS. 1-4. Spill gate 21 is connected to a pair of opposite pins 30 which enable spill gate 21 to rotate in a pair of brackets 33 which in turn are rigidly mounted to frame 11. Thus, rotary spill gate 21 can be rotated and moved between a closed position, as shown in FIG. 1, a completely open, or 100% open, position as shown in FIG. 4, or intermediate open positions, as shown in FIGS. 2 and 3. In its closed position, gate 21 prevents contaminated shot blast media 14 from flowing from hopper 15 to the magnetic drum 13. In its open positions, gate 21 permits media 14 to flow from hopper 15 to magnetic drum 13 at different calculated rates based upon the amount of media 14 detected by sensors 18-20 in hopper 15. Sensor 20 allows for the greatest flow rate while sensor 18 the least flow rate and sensor 19 at a rate less than sensor 20 but greater than sensor 18.

Spill gate 21 is substantially V-shaped and is positioned directly beneath outlet 17 of hopper 15 when in its closed position, as shown in FIG. 1. The leading edge or lip 31 of gate 21 is upturned at about a 45 degree angle resulting in lip 31 being substantially parallel to, but outside of, the side wall of hopper 15 when in its closed position (see FIG. 1) to provide a seal or closure to prevent flow of media 14 to magnetic drum 13. However, when in one of its open positions, lip 31 provides a structure that enables uniform distribution of media 14 to magnetic drum 13. Thus, as media 14 flows from hopper 15 onto gate 21, it eventually builds up to a point where it will flow over lip 31 to provide a uniform pattern of media 14 to drum 13 resulting in (a) a minimum thickness for the curtain of media 14 on the surface of drum 13 to improve separation efficiency; (b) an even and uniform thickness for the curtain of media 14 on the surface of drum 13 to further improve separation efficiency; and (c) a full width curtain of media 14 across the entire length of the face of drum 13 to also improve separation efficiency.

As shown best in FIG. 6, an actuator 22 is engaged with, or connected to, spill gate 21 for moving gate 21 between its closed position (FIG. 1) and its plurality of open positions (FIGS. 2-4). The actuator 22 is mounted at its closed end on frame 11 of separator 10 via a bracket 34, and is preferably an air cylinder. Thus, as the piston of the actuator 22 moves in and out of its corresponding cylinder, gate 21 is rotated on pins 30 to the various open and closed positions illustrated in FIGS. 1-4.

The magnetic separator 10 also includes a controller 23 coupled to the plurality of sensors 18-20 for receiving the signals generated by sensors 18-20, and operative to control the movement of the actuator 22 to in turn move spill gate 21 between its open and closed positions. The controller 23 automates the process of sensing the amount of media 14 in hopper 15 and moving spill gate 21 to its various open and closed positions in response thereto. The controller 23 is thus configured to control the movement of spill gate 21 to its various open positions when the contaminated media 14 fills hopper 15 in amounts detected by sensors 18-20, and to control the movement of spill gate 21 to its closed position when a relatively low amount of media 14 is in hopper 15 such that sensor 18 no longer detects any media 14. As shown best in FIG. 6, controller 23 is preferably a linear positioning sensor.

In another embodiment, a method of controlling the flow of contaminated media within a solid material separator, comprises the steps of: (a) feeding contaminated media to a hopper having an outlet through which the contaminated media may pass to a separator; (b) sensing the presence of and the amount of contaminated media in the hopper; and (c) controlling the movement of a spill gate between a closed position preventing contaminated media from flowing from the hopper to the separator and a plurality of open positions wherein contaminated media flows through the outlet of hopper to the separator at varying rates based upon the amount of contaminated media in the hopper.

The contaminated media is preferably contaminated shot blast media. In still another embodiment, the separator is a rotary magnetic drum, and the solid material separator is a magnetic separator.

In yet another embodiment, the method separator is an air chamber, and the solid material separator is an air wash separator.

In another preferred embodiment, a method of controlling the flow of contaminated shot blast media 14 within a magnetic separator 10 comprises the steps of (a) feeding contaminated shot blast media 14 to a hopper 15 having an outlet 17 through which the contaminated shot blast media 14 may pass to a rotary magnetic drum 13; (b) sensing the presence of and the amount of contaminated shot blast media 14 in the hopper 15; and (c) controlling the movement of a spill gate 21 between a closed position preventing contaminated shot blast media 14 from flowing from the hopper 15 to the magnetic drum 13 and a plurality of open positions wherein contaminated shot blast media 14 flows through the outlet 17 of hopper 15 to the rotary magnetic drum 13 at varying rates based upon the amount of contaminated shot blast media 14 in hopper 15.

What is claimed is:

1. A solid material separator for separating a desired particulate material from a mixture of contaminated media containing the desired particulate material, comprising:
   (a) a hopper for holding contaminated media, said hopper having an inlet through which contaminated media enters the hopper, and an outlet through which contaminated media exits the hopper;
   (b) a separator positioned below the outlet of said hopper for receiving the contaminated media flowing through said outlet from said hopper;
   (c) a compensating flow control assembly for automatically controlling the amount of contaminated media flowing from said hopper to said separator, comprising:
      (i) a rotary spill gate movable between a closed position covering said hopper outlet to prevent contaminated media from flowing to said separator, and a plurality of open positions where contaminated media flows through said hopper outlet to the separator at various flow rates based upon the amount of contaminated media in said hopper;
      (ii) a plurality of sensors mounted on said hopper configured to detect the presence of contaminated media within said hopper and positioned so that each sensor when triggered detects a different amount of contaminated media in said hopper, and generates a signal representative of an amount of contaminated media contained in said hopper, said plurality of sensors comprising a first sensor indicative of a lesser amount of contaminated media in said hopper, a second sensor indicative of a greater amount of contaminated media in said hopper than that indicated by said first sensor, and a third sensor indicative of a greater amount of contaminated media in said hopper than that indicated by said second sensor;

(iii) an actuator engaged with said spill gate for moving said spill gate between said closed position and said plurality of open positions; and (iv) a controller coupled to the plurality of sensors for receiving the signals generated by said sensors and operative to control the movement of said actuator to move said spill gate between said closed position and a first open position in response to a signal generated by said first sensor to allow contaminated media to flow from said hopper to said separator at a first rate, a second open position in response to a signal generated by said second sensor, said second open position being more open than said first open position, to allow contaminated media to flow from said hopper to said separator at a second rate, said second rate being greater than said first rate and a third open position in response to a signal generated by said third sensor, said third open position being more open than said second open position, to allow contaminated media to flow from said hopper to said separator at a third rate, said third rate being greater than said second rate, and said spill gate being in said closed, first, second and third positions until one of said sensors generates a signal indicative of a different amount of contaminated media in said hopper.

2. The solid material separator of claim 1 wherein said contaminated media is contaminated shot blast media.

3. The solid material separator of claim 1 wherein said separator is a rotary magnetic drum, and said solid material separator is a magnetic separator.

4. A magnetic separator, comprising:

(a) a hopper for holding contaminated shot blast media, said hopper having an inlet through which contaminated shot blast media enters the hopper, and an outlet through which contaminated shot blast media exits the hopper;

(b) a rotary magnetic drum positioned below the outlet of said hopper for receiving the contaminated shot blast media flowing through said outlet from said hopper;

(c) a compensating flow control assembly for automatically controlling the amount of contaminated shot blast media flowing from said hopper to said magnetic drum, comprising:

(i) a rotary spill gate movable between a closed position covering said hopper outlet to prevent contaminated shot blast media from flowing to said magnetic drum, and a plurality of open positions where contaminated shot blast media flows through said hopper outlet to the rotary magnetic drum at various flow rates based upon the amount of contaminated shot blast media in said hopper;

(ii) a plurality of sensors mounted on said hopper configured to detect the presence of contaminated shot blast media within said hopper and positioned so that each sensor when triggered detects a different amount of contaminated shot blast media in said hopper, and generates a signal representative of an amount of contaminated shot blast media contained in said hopper, said plurality of sensors comprising a first sensor indicative of a lesser amount of contaminated shot blast media in said hopper a second sensor indicative of a greater amount of contaminated shot blast media in said hopper than that indicated by said first sensor, and a third sensor indicative of a greater amount of contaminated shot blast media in said hopper than that indicated by said second sensor;

(iii) an actuator engaged with said spill gate for moving said spill gate between said closed position and said plurality of open positions; and (iv) a controller coupled to the plurality of sensors for receiving the signals generated by said sensors and operative to control the movement of said actuator to in turn move said spill gate between said closed position and a first open position in response to a signal generated by said first sensor to allow contaminated shot blast media to flow from said hopper to said separator at a first rate, a second open position in response to a signal generated by said second sensor, said second open position being more open than said first open position, to allow contaminated shot blast media to flow from said hopper to said separator at a second rate, said second rate being greater than said first rate and a third open position in response to a signal generated by said third sensor, said third open position being more open than said second open position, to allow contaminated shot blast media to flow from said hopper to said separator at a third rate, said third rate being greater than said second rate and said spill gate being in said closed, first, second and third positions until one of said sensors generates a signal indicative of a different amount of contaminated shot blast media in said hopper.

5. The magnetic separator of claim 4 wherein the sensors are capacitive proximity switches.

6. The magnetic separator of claim 4 wherein the actuator is an air cylinder.

7. A method of controlling the flow of contaminated media within a solid material separator, comprises the steps of:

(a) feeding contaminated media to a hopper having an outlet through which the contaminated media may pass to a separator;

(b) sensing the presence of and the amount of contaminated media in the hopper by using a first sensor indicative of a lesser amount of contaminated media in said hopper, a second sensor indicative of a greater amount of contaminated media in said hopper than that indicated by said first sensor, and a third sensor indicative of a greater amount of contaminated media in said hopper than that indicated by said second sensor, and (c) controlling the movement of a spill gate between a closed position preventing contaminated media from flowing from the hopper to the separator and a plurality of open positions wherein contaminated media flows through the outlet of hopper to the separator at varying rates based upon the amount of contaminated media in the hopper, whereby said spill gate moves between said closed position and a first open position in response to a signal generated by said first sensor to allow contaminated media to flow from said hopper to said separator at a first rate, a second open position in response to a signal generated by said second sensor, said second open position being more open than said first open position, to allow contaminated media to flow from said hopper to said separator at a second rate, said second rate being greater than said first rate, and a third open position in response to a signal generated by said third sensor, said third open position being more open than said second open position, to allow contaminated media to flow from said hopper to said separator at a third rate, said third rate being greater than said second rate, and said spill gate being in said closed, first, second and third positions until one of said sensors generates a signal indicative of a different amount of contaminated media in said hopper.

8. The method of claim 7 wherein said contaminated media is contaminated shot blast media.

9. The method of claim 8 wherein said separator is a rotary magnetic drum, and said solid material separator is a magnetic separator.

10. A method of controlling the flow of contaminated shot blast media within a magnetic separator, comprises the steps of:
   (a) feeding contaminated shot blast media to a hopper having an outlet through which the contaminated shot blast media may pass to a rotary magnetic drum;
   (b) sensing the presence of and the amount of contaminated shot blast media in the hopper by using a first sensor indicative of a lesser amount of contaminated shot blast media in said hopper, a second sensor indicative of a greater amount of contaminated shot blast media in said hopper than that indicated by said first sensor, and a third sensor indicative of a greater amount of contaminated shot blast media in said hopper than that indicated by said second sensor; and
   (c) controlling the movement of a spill gate between a closed position preventing contaminated shot blast media from flowing from the hopper to the magnetic drum and a plurality of open positions wherein contaminated shot blast media flows through the outlet of hopper to the rotary magnetic drum at varying rates based upon the amount of contaminated shot blast media in the hopper, whereby said spill gate moves between said closed position and a first open position in response to a signal generated by said first sensor to allow contaminated shot blast media to flow from said hopper to said rotary magnetic drum at a first rate a second open position in response to a signal generated by said second sensor, said second open position being more open than said first open position, to allow contaminated shot blast media to flow from said hopper to said rotary magnetic drum at a second rate, said second rate being greater than said first rate, and a third open position in response to a signal generated by said third sensor, said third open position being more open than said second open position, to allow contaminated shot blast media to flow from said hopper to said rotary magnetic drum at a third rate, said third rate being greater than said second rate and said spill gate being in said closed first, second and third positions until one of said sensors generates a signal indicative of a different amount of contaminated shot blast media in said hopper.

11. The method of claim 10 wherein the step of controlling includes using said signals to move an actuator coupled to said spill gate.

* * * * *